(12) United States Patent
Ho et al.

(10) Patent No.: US 9,805,753 B2
(45) Date of Patent: Oct. 31, 2017

(54) ENHANCED WRITE POLE AND RETURN POLE FOR IMPROVED AREAL DENSITY

(71) Applicant: HGST Netherlands B.V., Amsterdam (NL)

(72) Inventors: Kuok San Ho, Redwood City, CA (US); Suping Song, Fremont, CA (US); Petrus Antonius Van Der Heijden, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/078,963

(22) Filed: Mar. 23, 2016

(65) Prior Publication Data

US 2017/0278532 A1 Sep. 28, 2017

(51) Int. Cl.
G11B 5/60 (2006.01)

(52) U.S. Cl.
CPC .............. *G11B 5/6082* (2013.01); *G11B 5/60* (2013.01)

(58) Field of Classification Search
CPC ................................ G11B 5/60; G11B 5/6082
USPC ............................ 360/125.3, 125.31, 125.32
See application file for complete search history.

(56) References Cited

U.S. PATENT DOCUMENTS

| | | | |
|---|---|---|---|
| 6,342,311 B1 | 1/2002 | Inturi et al. | |
| 7,159,302 B2 | 1/2007 | Feldbaum et al. | |
| 7,322,095 B2 | 1/2008 | Guan et al. | |
| 8,189,292 B2 | 5/2012 | Pentek et al. | |
| 8,400,733 B2 | 3/2013 | Shin et al. | |
| 8,441,757 B2 | 5/2013 | Chen et al. | |
| 8,451,562 B2* | 5/2013 | Pentek | G11B 5/1278 360/119.03 |
| 9,025,280 B2 | 5/2015 | Bai et al. | |
| 9,036,299 B2 | 5/2015 | Chembrolu | |
| 9,153,254 B1* | 10/2015 | Rivkin | G11B 5/17 |
| 9,508,364 B1* | 11/2016 | Tang | G11B 5/112 |
| 2008/0002293 A1* | 1/2008 | Sasaki | G11B 5/1278 360/125.33 |
| 2008/0266720 A1* | 10/2008 | Yazawa | G11B 5/3163 360/314 |
| 2008/0316646 A1* | 12/2008 | Na | G11B 5/1278 360/123.05 |
| 2009/0265917 A1* | 10/2009 | Sugimoto | G11B 5/1278 29/603.13 |
| 2010/0259845 A1* | 10/2010 | Miyauchi | G11B 5/3116 360/51 |
| 2011/0063755 A1* | 3/2011 | Bai | G11B 5/1278 360/123.12 |
| 2011/0262774 A1* | 10/2011 | Pentek | G11B 5/1278 428/815 |
| 2012/0044598 A1* | 2/2012 | Bai | G11B 5/1278 360/123.12 |
| 2015/0199983 A1* | 7/2015 | Mooney | G11B 5/265 360/235.4 |

* cited by examiner

*Primary Examiner* — Allen T Cao
(74) *Attorney, Agent, or Firm* — Foley & Lardner LLP

(57) ABSTRACT

A system, according to one embodiment, includes: a main pole; and a trailing shield. A first distance D1 is defined in a track direction between the trailing shield and a pole tip region of the main pole; and a second distance D2 is defined in the track direction between the trailing shield and a second region of the main pole located behind the pole tip region, where D2 is greater than D1. Other systems, and methods are described in additional embodiments.

15 Claims, 7 Drawing Sheets

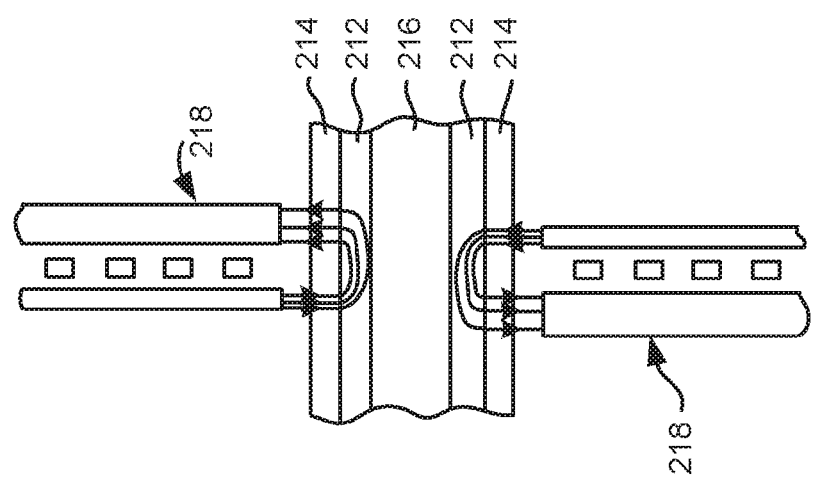
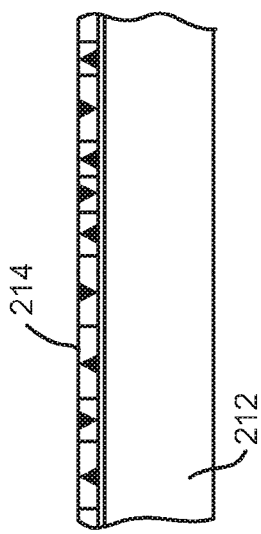
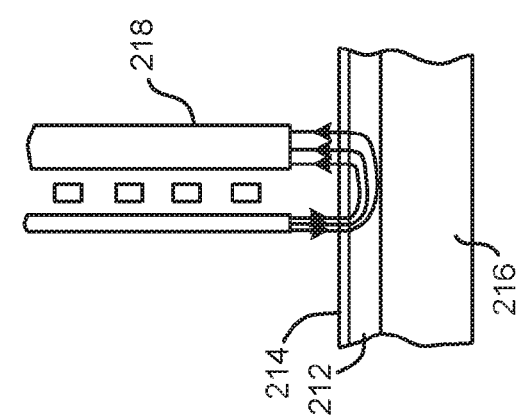
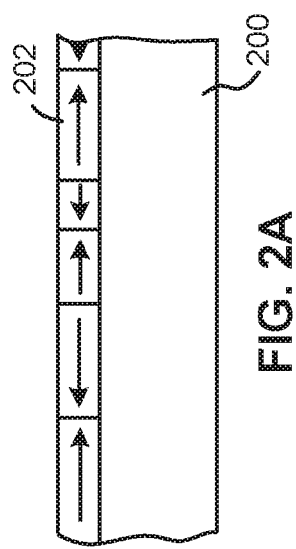
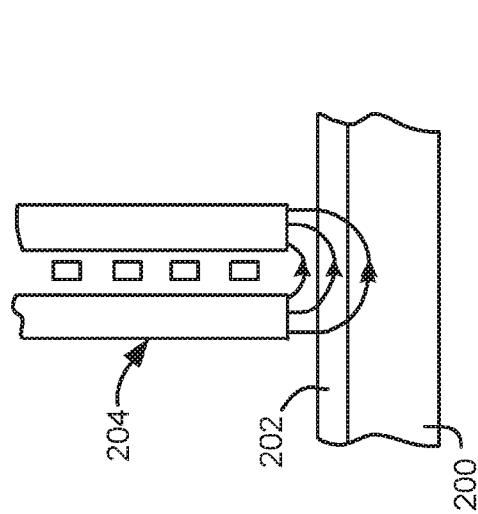

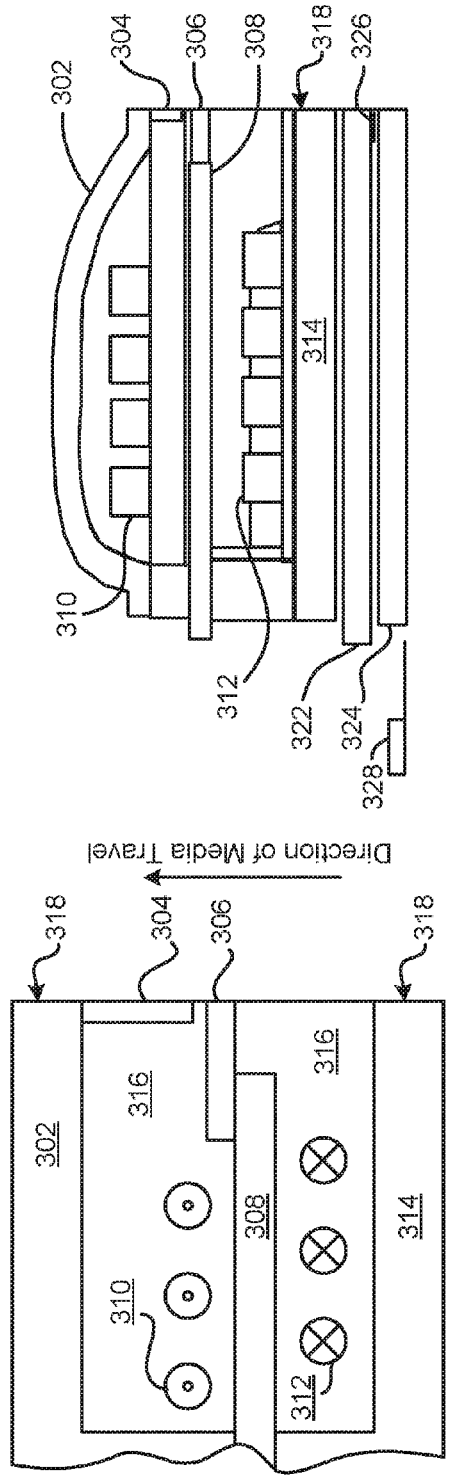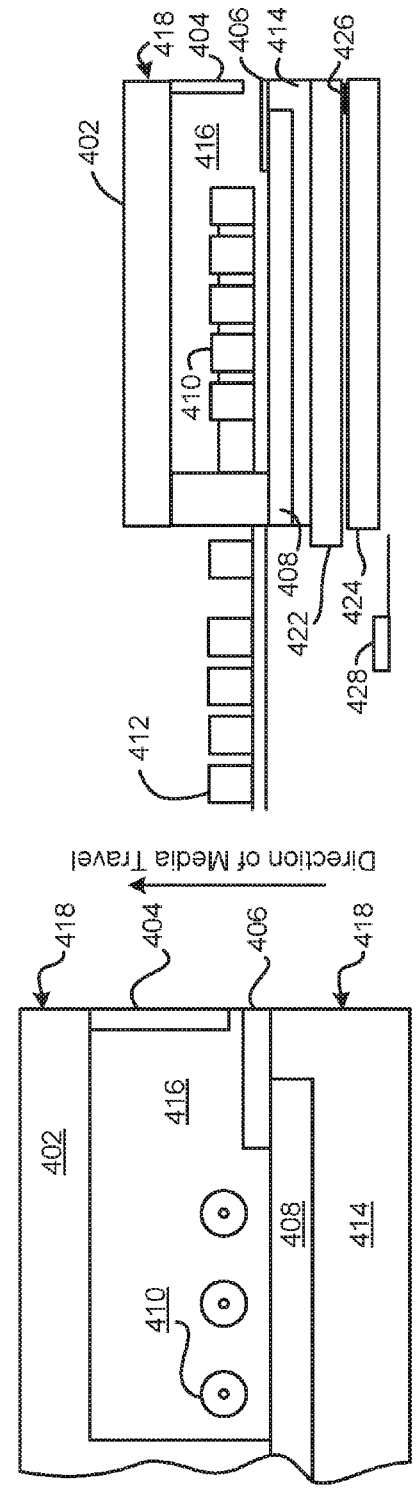

ENHANCED WRITE POLE AND RETURN POLE FOR IMPROVED AREAL DENSITY

FIELD OF THE INVENTION

The present invention relates to data storage systems, and more particularly, this invention relates to magnetic recording write heads having improved design for increased areal density capability (ADC), and methods for making the same.

BACKGROUND

The heart of a computer is a magnetic disk drive which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating (in some disk drives, there is a load/unload ramp so contact with the disk does not occur); but, when the disk rotates, air is swirled by the rotating disk adjacent a media facing surface of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to achieve this desire is to increase the capacity by increasing the recording density of the HDD. To achieve higher recording densities, such as those exceeding 1 Tbit/inch$^2$, further miniaturization of recording bits is effective, which in turn typically requires the design of smaller and smaller components. However, the further miniaturization of the various components presents its own set of challenges and obstacles.

SUMMARY

A system, according to one embodiment, includes: a main pole; and a trailing shield. A first distance D1 is defined in a track direction between the trailing shield and a pole tip region of the main pole; and a second distance D2 is defined in the track direction between the trailing shield and a second region of the main pole located behind the pole tip region, where D2 is greater than D1.

A system, according to another embodiment, includes: a main pole; a trailing shield; and an upper bump on the main pole between the main pole and the trailing shield, the upper bump being of a magnetic material. A maximum width of the upper bump in a cross-track direction is less than a maximum width of the main pole.

A system, according to yet another embodiment, includes: a main pole; a trailing shield; and a lower bump on the main pole between the main pole and a leading shield, the lower bump being of a magnetic material. A maximum width of the lower bump in a cross-track direction is less than a maximum width of the main pole.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for perpendicular recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. Various embodiments described herein include magnetic recording write heads having improved designs for achieving increased ADC, as will be described in further detail below.

In one general embodiment, a system includes: a main pole; and a trailing shield. A first distance D1 is defined in a track direction between the trailing shield and a pole tip region of the main pole; and a second distance D2 is defined in the track direction between the trailing shield and a second region of the main pole located behind the pole tip region, where D2 is greater than D1.

In another general embodiment, a system includes: a main pole; a trailing shield; and an upper bump on the main pole between the main pole and the trailing shield, the upper bump being of a magnetic material. A maximum width of the upper bump in a cross-track direction is less than a maximum width of the main pole.

In yet another general embodiment, a system includes: a main pole; a trailing shield; and a lower bump on the main pole between the main pole and a leading shield, the lower bump being of a magnetic material. A maximum width of the lower bump in a cross-track direction is less than a maximum width of the main pole.

Figure 1:
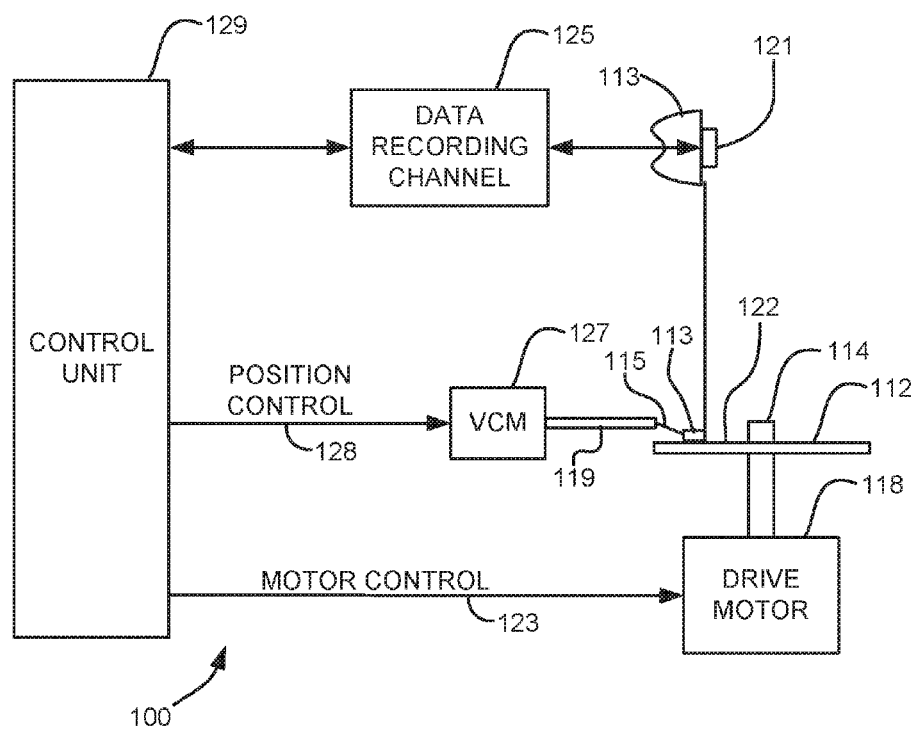
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121 (e.g., of a magnetic head). As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

In some embodiments, the disk drive 100 of FIG. 1 may be implemented for heat assisted magnetic recording (HAMR). Accordingly, the disk drive 100 may include an apparatus, e.g., see 500 and/or 600 of FIGS. 5 and 6A-6H, respectively. Thus, the read/write heads 121 of the disk drive 100 may operate in combination with an NFT as described in detail below.

With continued reference to the disk drive 100 of FIG. 1, an interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers of the write portion by a gap layer at or near a media facing surface of the head (sometimes referred to as an air bearing surface in a disk drive). The pole piece layers may be connected at a back gap. Currents are conducted through the coil layer, which produce magnetic fields in the pole pieces. The magnetic fields fringe across the gap at the media facing surface for the purpose of writing bits of magnetic field information in tracks on moving media, such as in circular tracks on a rotating magnetic disk.

The second pole piece layer has a pole tip portion which extends from the media facing surface to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disk recording systems, such as that shown in FIG. 1. This medium is utilized for recording magnetic domains in or parallel to the plane of the medium itself. The recording medium, a recording disk in this instance, comprises basically a supporting substrate 200 of a suitable non-magnetic material such as glass, with an overlying coating 202 of a suitable and conventional magnetic layer.

FIG. 2B shows the operative relationship between a conventional recording head 204, which may preferably be a thin film head, and a longitudinal recording medium, such as that of FIG. 2A.

FIG. 2C illustrates, schematically, a perpendicular recording head where, the orientation of magnetic domains substantially perpendicular to the surface of a recording medium as used with magnetic disk recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material in the form of magnetic domains having their axes of magnetization substantially perpendicular to the surface of the medium. The flux is channeled by the soft under layer 212 back to the return pole of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing surface 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing surface 318. The media facing surface 318 is indicated across the right side of the structure.

Perpendicular writing is achieved by forcing flux through the stitch pole 308 into the main pole 306 and then to the surface of the disk positioned towards the media facing surface 318.

FIG. 3B illustrates a piggyback magnetic head having similar features to the head of FIG. 3A. Shield 304 and return pole 314 flank the stitch pole 308 and main pole 306. Also sensor shields 322, 324 are shown. The read sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing surface 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing surface 418). The media facing surface 418 is indicated across the right side of the structure. The trailing shield 404 may be in contact with the main pole 406 in some embodiments.

FIG. 4B illustrates another type of piggyback magnetic head having similar features to the head of FIG. 4A including looped coils 410, which loop around to form looped coils 412. Also, sensor shields 422, 424 are shown, with the upper sensor shield 422 spaced from the writer by a nonmagnetic layer 414. The sensor 426 is typically positioned between the sensor shields 422, 424.

In FIGS. 3B and 4B, an optional heater 328, 428, respectively, is shown away from the media facing surface of the magnetic head. Heaters 328, 428 may be used to heat the layers surrounding (e.g., adjacent) sensor 426 to adjust the amount of thermal expansion experienced thereby. Heaters 328, 428 may thereby selectively adjust the amount of protrusion experienced at the media facing surface of the heads in FIGS. 3B and 4B, as would be appreciated by one skilled in the art upon reading the present embodiment. Thus, the position of the heaters 328, 428 may vary based on design parameters such as where the protrusion is desired, coefficients of thermal expansion of the surrounding layers, etc. Moreover, a heater (e.g., similar and/or the same as heaters 328, 428) may also be included in the magnetic head shown in FIG. 3A and/or FIG. 4A.

As previously mentioned, the volume of information processing is increasing rapidly. In particular, it is desired that HDDs be able to store more information in their limited area and volume. A technical approach to achieve this desire is to increase the capacity by increasing the recording density of the HDD. Many previous designs have relied on the further miniaturization of components in magnetic write heads. However, the further miniaturization of the various components presents its own set of challenges and obstacles in terms of processing limitations, operational stability, etc.

In sharp contrast, various embodiments described herein include magnetic write heads having enhanced designs which result in improved performance. Modifying the main pole and/or surrounding layers may provide increased ADC, as will be described in further detail below.

Looking to FIGS. 5A-5D, a system 500 is illustrated in accordance with one embodiment. As an option, the present system 500 may be implemented in conjunction with features from any other embodiment listed herein, such as those described with reference to the other FIGS. However, such system 500 and others presented herein may be used in various applications and/or in permutations which may or may not be specifically described in the illustrative embodiments listed herein. Further, the system 500 presented herein may be used in any desired environment. Thus FIGS. 5A-5D (and the other FIGS.) may be deemed to include any possible permutation. Note that additional layers may be present. Moreover, unless otherwise specified, the various layers in this and other embodiments herein may be formed using conventional processes.

System 500 includes a magnetic head 501 having a leading shield 502, main pole 504, and trailing shield 506. As shown, leading shield 502 and trailing shield 506 are positioned on opposite sides of main pole 504 along the track direction "y". Moreover, side shields 508, 510 sandwich the main pole 504 along the cross-track direction "x". The main pole 504 is shown in the present embodiment as having a negative bevel with respect to the intersection with side shields 508, 510, but in other embodiments, the sides of the main pole 504 along the track direction "y" may have a different beveling, e.g., as would be apparent to one skilled in the art upon reading the present description.

A first nonmagnetic layer 512 is positioned between main pole 504 and the leading shield 502 and side shields 508 and 510, while a second nonmagnetic layer 514 is positioned between main pole 504 and the trailing shield 506. Furthermore, an optional layer 515 is included in the present embodiment between the second nonmagnetic layer 514 and the trailing shield 506. Optional layer 515 effectively extends the edge of the trailing shield 506 and thereby has been represented by a dashed line. Accordingly, optional layer 515 preferably includes a high moment material, e.g., optional layer 515 may be a seed layer for trailing shield 506.

Figure 5A:
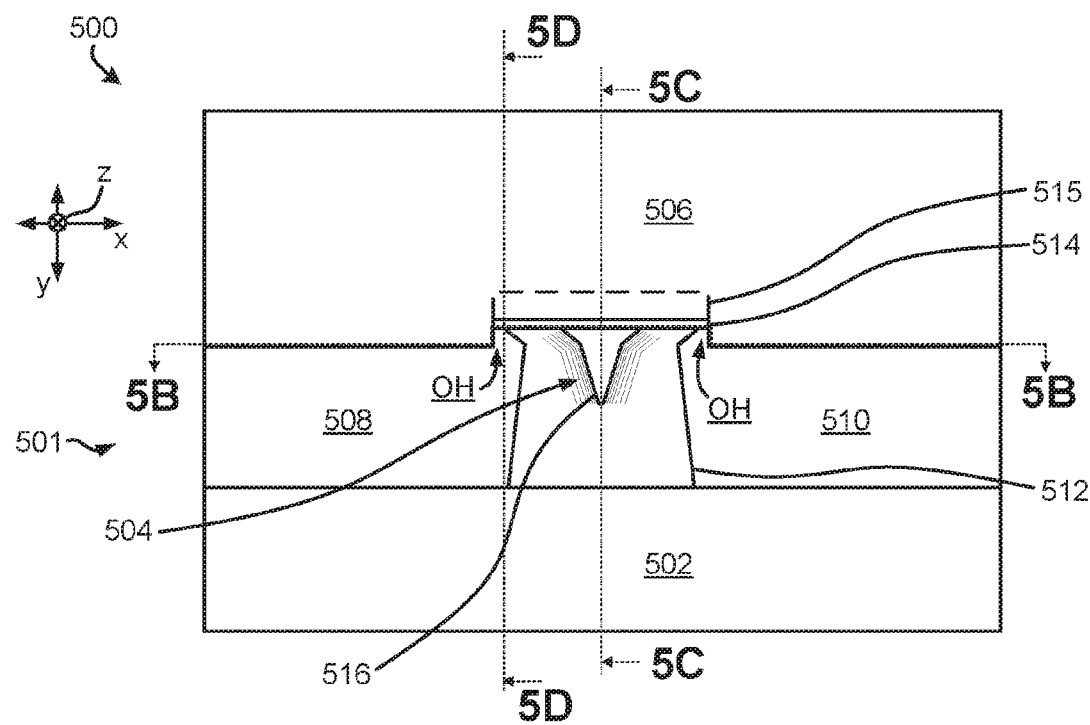
FIG. 5A is a partial media facing surface view of a magnetic write head according to one embodiment.
Figure 5B:
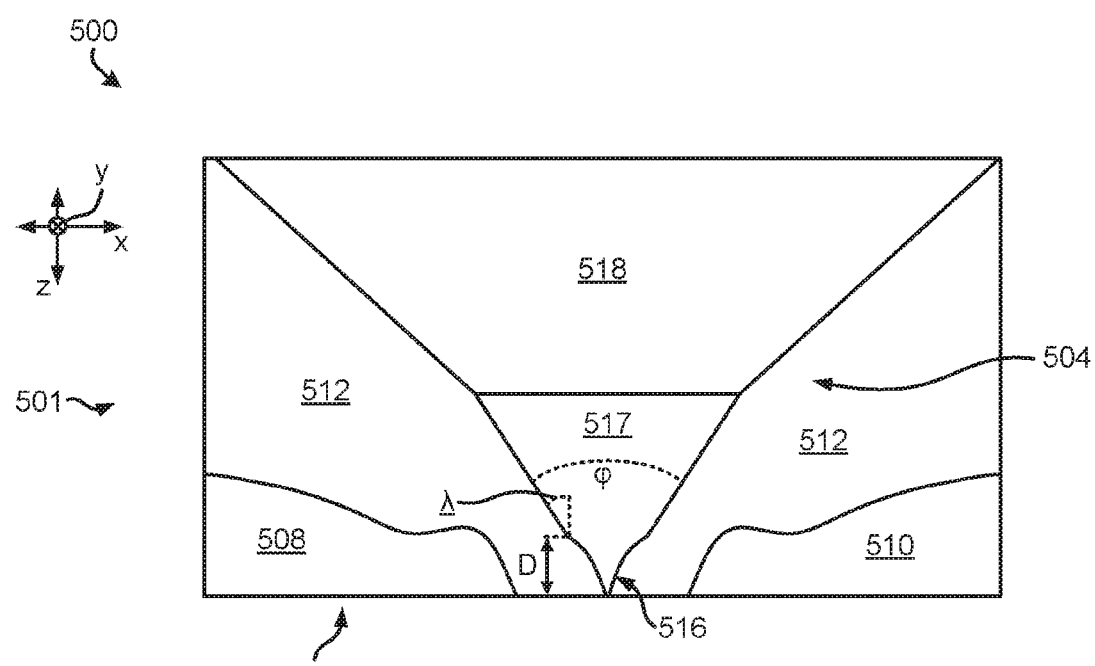
FIG. 5B is a partial top down view of the magnetic write head taken along line 5B-5B of FIG. 5A.

Referring momentarily to FIG. 5B, a partial top down view of the head 501 is shown along an upper surface of the main pole 504 and side shields 508, 510 as indicated by dashed line 5B-5B in FIG. 5A. In other words, all layers above the main pole 504 and side shields 508, 510 are not shown in the top down view in FIG. 5B.

Accordingly, FIG. 5B depicts the main pole 504 as having a pole tip region 516 and a P2 pole region 518 recessed from the media facing surface 503 along the height direction "z". The pole tip region 516 tapers towards the media facing surface 503 at an average angle φ measured in the z-x plane as shown. The angle φ is preferably greater than about 30 degrees and less than about 90 degrees, e.g., about 60 degrees, but may be higher or lower depending on the desired embodiment.

Moreover, the pole tip region 516 may be flared in some embodiments, preferably by an increased amount, e.g., in comparison to previous designs. Although an increased amount of flare is desired along the media facing edge of the pole tip region 516 of the main pole 504, it is preferred that the pole tip does not flare so much as to cause degraded performance of the main pole 504. According to an example, which is in no way intended to limit the invention, the amount of flare used keeps the angle λ between the flared region and the remainder of the pole tip region 516 less than about 50 degrees at a distance D of about 200 nm from the media facing surface 503. Moreover, it may also be desirable to reduce the stripe height (measured in the height direction "z") of the leading and/or trailing shields 502, 506 near the main pole 504 as seen in the present embodiment, e.g., in comparison to previous designs. By reducing the stripe height of one or both of the leading and trailing shields 502, 506 may further improve performance. However, as previously mentioned, the aforementioned dimensions may vary depending on the desired embodiment. For example, the main pole 504 may extend wider in the cross-track direction "x". According to one approach, the main pole 504 may extend farther into the side gap and/or overhang OH seen in FIG. 5A, thereby widening the main pole 504 in the cross-track direction "x". However, it is preferred that the main pole 504 does not extend past the edge of the overhang OH, and into the trailing shield, e.g., to prevent shunting.

Figure 5C:
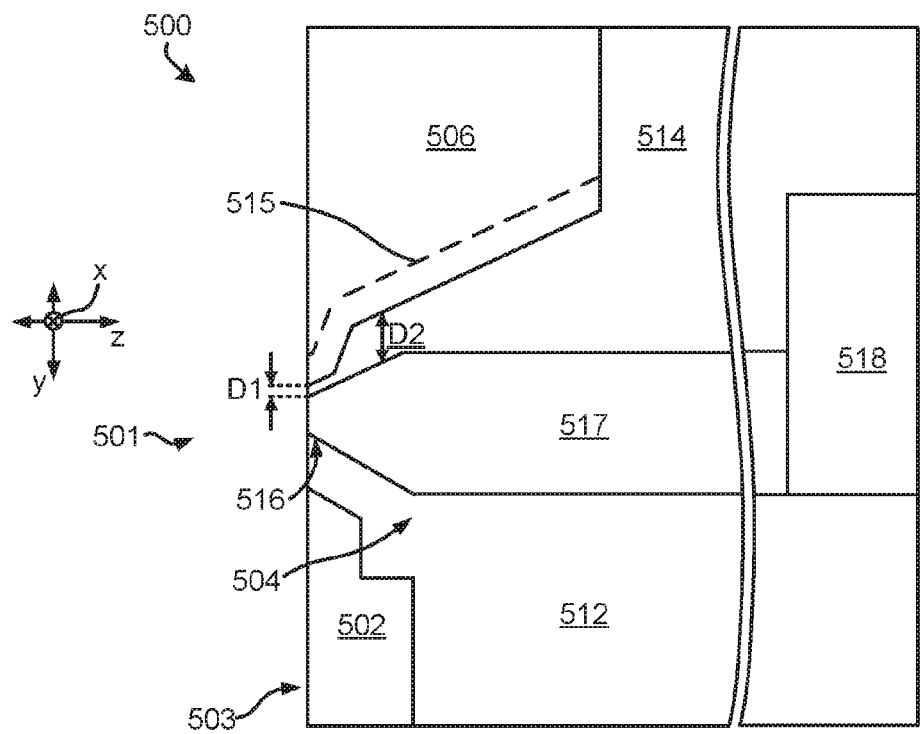
FIG. 5C is a partial cross-sectional view of the magnetic write head taken along line 5C-5C of FIG. 5A.

Referring now to FIG. 5C, the layers seen along the media facing surface view of FIG. 5A are shown as extending away from the media facing surface 503. A first distance D1 has been defined in a track direction "y" between the trailing shield 506 and the pole tip region 516 of the main pole 504. Moreover, a second distance D2 has also been defined in a track direction "y" between the trailing shield 506 and a second region 517 of the main pole 504 located behind the pole tip region 516 with respect to the media facing surface 503 of the head 501.

It is preferred that D2 is greater than D1. According to an illustrative approach which is in no way intended to limit the invention, the distance D1 between the trailing shield 506 and the pole tip region 516 may be about 22 nm, while the distance D2 between the trailing shield 506 and a second region 517 may be about 82 nm. Implementing an increased amount of separation between the trailing shield 506 and a second region 517 (e.g., with respect to D1) may desirably allow for an upper bump to be formed on an upper surface of the main pole 504 between the main pole 504 and the trailing shield 506 (e.g., see 602 of FIGS. 6A and 6D). Moreover, the distance D2 is preferably great enough such that the upper bump is sufficiently spaced from the trailing shield 506, e.g., to avoid shunting therebetween. As a result, performance of the system 500 as a whole may be improved.

Figure 5D:
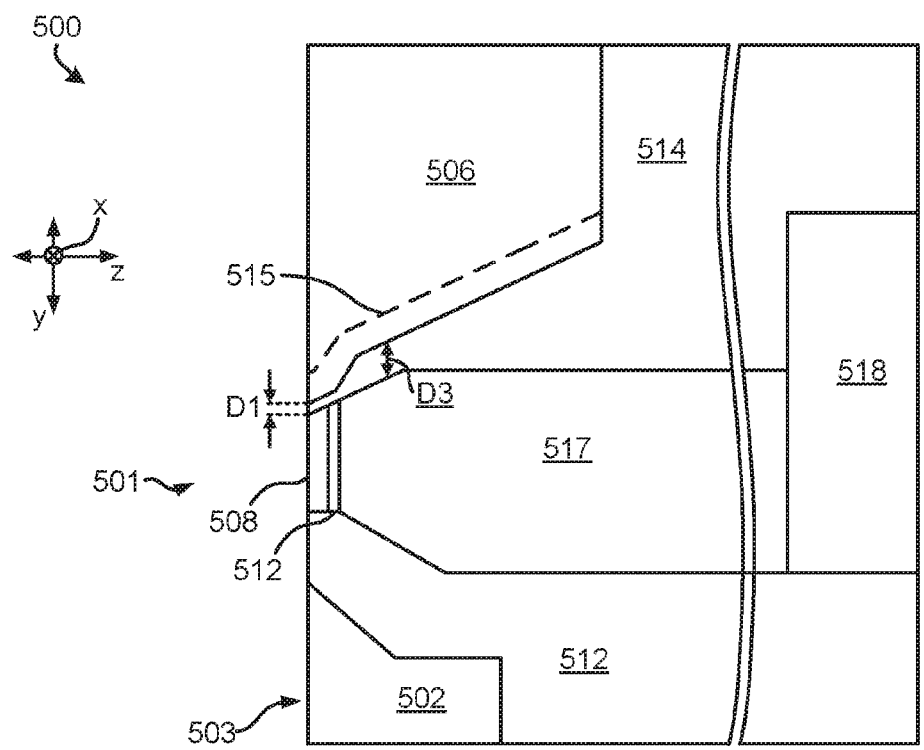
FIG. 5D is a partial cross-sectional view of the magnetic write head taken along line 5D-5D of FIG. 5A.

Furthermore, looking to FIG. 5D, the layers seen along the media facing surface view of FIG. 5A are again shown as extending away from the media facing surface 503 along a different z-y plane. As described above, D1 represents a distance defined and measured in a track direction "y" between the trailing shield 506 and the pole tip region 516 of the main pole 504. Furthermore, a third distance D3 is defined in the track direction "y" in a side gap between the trailing shield 506 and a plane extending along an upper surface of the second region 517 of the main pole 504. In other words, the third distance D3 is measured in a side gap between the trailing shield 506 and a plane extending along an upper surface of the second region 517 of the main pole 504. D3 is depicted as extending between 506 and 508 in view of the plane of view shown in FIG. 5D. Referring back to FIG. 5A, the partial cross-sectional view shown in FIG. 5D corresponds to a plane of view in the side gap which extends along the side shield 508 until intersecting with the P2 pole region 518 recessed from the media facing surface 503 along the height direction "z".

Referring still to FIG. 5D, the tapered upper surface of the side shield 508 as shown in the present embodiment is part of a plane which extends along an upper surface of the second region 517 of the main pole 504, e.g., as seen in FIG. 5C. Accordingly, the third distance D3 is shown as being measured between the trailing shield 506 and an upper surface of the side shield 508.

In preferred approaches, D3 is less than D2. Moreover, in some approaches, D3 may be greater than D1. However, in other approaches, D3 may be substantially the same value as D1. Accordingly, D3 may be greater than or equal to about 22 nm and less than about 82 nm, e.g., depending on the desired embodiment. According to an exemplary approach, D3 may be about 47 nm. In further approaches, it may be desirable to increase the separation between the pole tip region 516 of the main pole 504 and the leading shield 502 along the track direction "y", e.g., in comparison to previous designs.

Figure 6A:
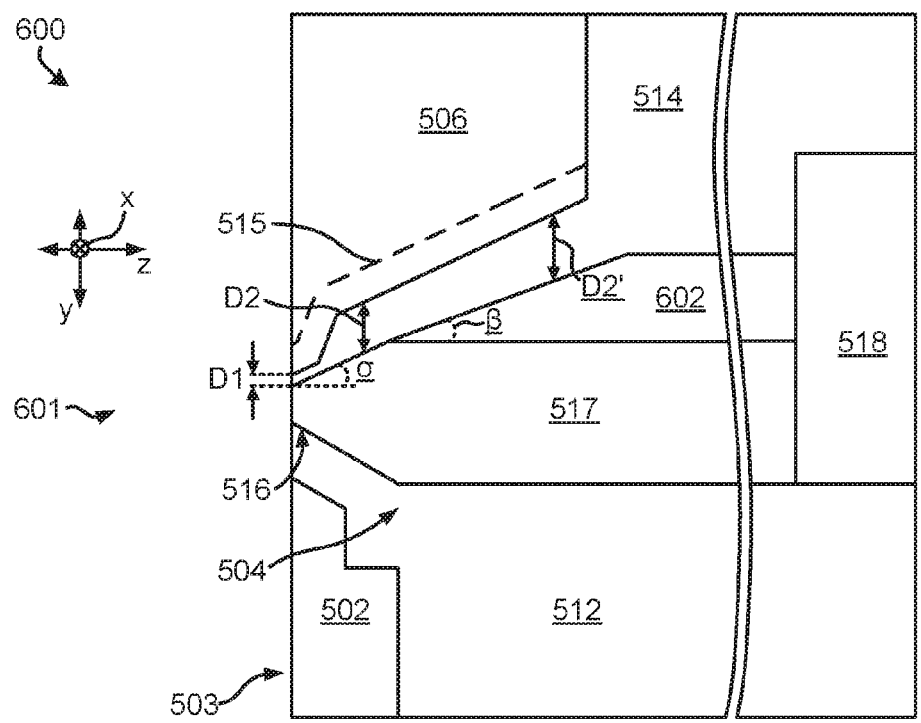
FIG. 6A is a partial cross-sectional view of a magnetic write head according to one embodiment.

As mentioned above, in some embodiments, an upper bump may be formed on an upper surface of the main pole 504 between the main pole 504 and the trailing shield 506. Referring now to FIG. 6A, a system 600 having a magnetic head 601 is illustrated in accordance with one embodiment. As an option, the present system 600 may be implemented in conjunction with features from any other embodiment listed herein, such as those described with reference to the other FIGS., such as FIGS. 5A-5D. Specifically, FIG. 6A illustrates variations of the embodiment of FIGS. 5A-5D depicting an exemplary configuration within a magnetic head 601. Accordingly, various components of FIG. 6A have common numbering with those of FIGS. 5A-5D.

However, such system 600 and others presented herein may be used in various applications and/or in permutations which may or may not be specifically described in the illustrative embodiments listed herein. Further, the system 600 presented herein may be used in any desired environment. Thus FIG. 6A (and the other FIGS.) may be deemed to include any possible permutation.

Looking to FIG. 6A, an upper bump 602 is included on an upper surface of the main pole 504 (e.g., positioned above the second region 517) between the main pole 504 and the trailing shield 506. As shown, the upper bump 602 tapers in the track direction "y" toward a media facing side thereof. In other words, a thickness of the upper bump 602 tapers toward a side of the upper bump 602 closest to the media facing surface 503. The non-tapered thickness of the upper bump 602 along the track direction "y" (e.g., the deposition direction) may be between about 100 nm and about 250 nm, more preferably between about 150 nm and about 200 nm but could be higher or lower depending on the desired embodiment.

An average angle $\beta$ of the tapering for the upper bump 602 in the track direction "y" may be between about 10 and about 25 degrees, more preferably between about 15 and about 18 degrees, but may be higher or lower depending on the desired embodiments. Moreover, an average angle $\sigma$ at which the main pole 504 tapers may be about 25 degrees. Thus, in some approaches the upper bump 602 and the main pole 504 may taper at about the same angle (e.g., see FIG. 6D). However, in the present embodiment, the upper bump 602 tapers at a smaller angle than the angle at which the main pole 504 tapers. Thus, the upper bump 602 tapers less therealong toward the media facing side thereof than the main pole 504 directly thereunder tapers over the same distance in the height direction "z".

Moreover, the distance D2 between the trailing shield 506 and a second region 517 may be different than the distance D2' between the trailing shield 506 and the upper bump 602, e.g., if the main pole 504 and the upper bump 602 taper at different angles towards the media facing surface 503 (e.g., as in the present embodiment). Moreover, distance D2' between the trailing shield 506 and the upper bump 602 may vary along the upper surface of the upper bump 602 as a result of the taper angle thereof, as would be apparent to one skilled in the art upon reading the present description.

Figure 6B:
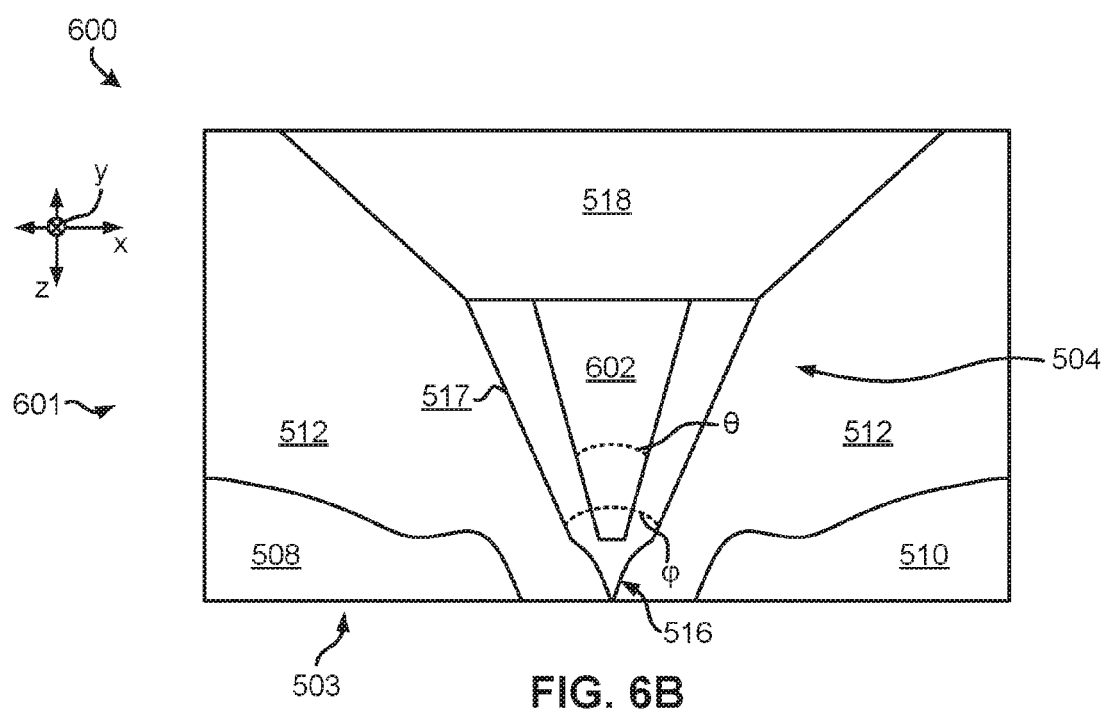
FIG. 6B is a partial top down view of the magnetic write head of FIG. 6A

Referring momentarily to FIG. 6B, a top down view of the main pole 504 and side shields 508, 510 are shown with second nonmagnetic layer 514 and trailing shield 506 removed, e.g., to present an unobstructed top down view of the main pole 504.

As shown, the upper bump 602 and/or main pole 504 may taper in the cross-track direction "x" towards the media facing surface 503. In preferred approaches, the upper bump 602 tapers less therealong in a cross-track direction "x" toward the media facing side thereof than the main pole 504 directly thereunder tapers along the same direction. Accordingly, sidewalls of the upper bump 602 positioned opposite each other in a cross-track direction "x" form a relatively smaller angle $\theta$ than the angle $\phi$ formed by the sidewalls of the main pole 504 positioned opposite each other in the cross-track direction "x". According to an illustrative approach, the angle $\theta$ of tapering for the upper bump 602 may be about 30 degrees, but could be higher or lower depending on the desired embodiment. Moreover, as mentioned above, the angle $\phi$ of tapering for the main pole 504 may be greater than about 30 degrees and less than about 90 degrees, e.g., about 60 degrees, but may be higher or lower depending on the desired embodiment.

In preferred approaches, the upper bump 602 includes at least one magnetic material, e.g., of a type known in the art. Moreover, although it is preferred that the upper bump 602 is of the same or a similar material as the main pole 504, in some approaches the upper bump 602 may include a different magnetic material. As mentioned above, including an upper bump 602 may desirably increase the performance of the head 601, thereby improving overall efficiency of the system 600 as a whole.

Upper bump 602 may be formed by adding a processing step, e.g., such as masking, milling, etc., between formation of the main pole 504 and formation of the P2 pole region 518. In further approaches, a lower bump (e.g., see FIGS. 6C-6D) below the main pole 504 may be formed by adding a process step, e.g., such as masking, milling, etc., before formation of the main pole 504, e.g., as would be apparent to one skilled in the art upon reading the present description.

Figure 6C:
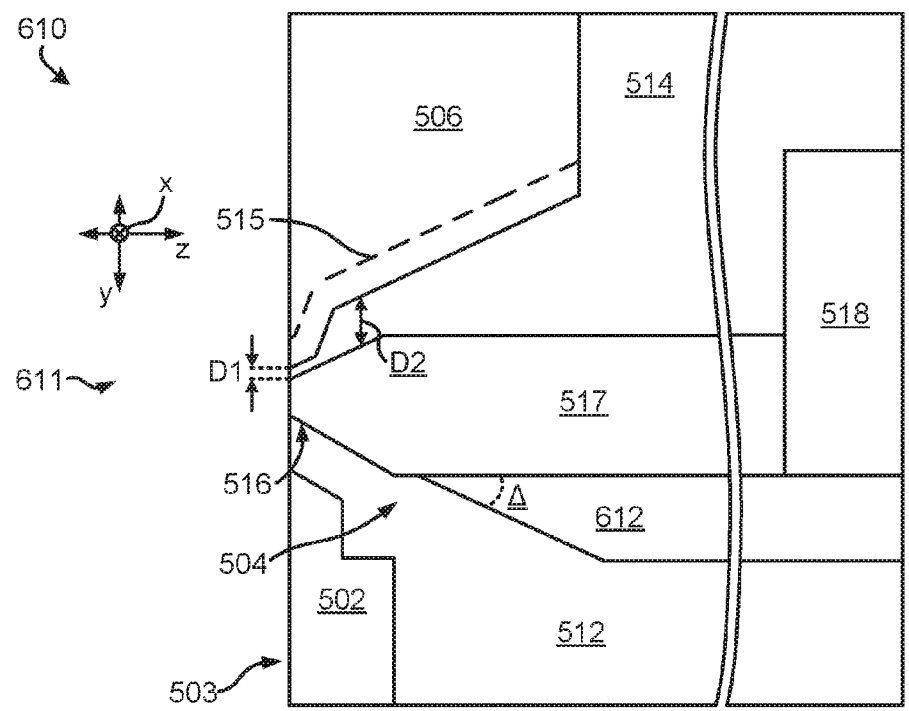
FIG. 6C is a partial cross-sectional view of a magnetic write head according to one embodiment.

Similarly, FIG. 6C depicts a system 610 having a magnetic head 611 which is illustrated in accordance with another embodiment. As an option, the present system 610 may be implemented in conjunction with features from any other embodiment listed herein, such as those described with reference to the other FIGS., such as FIGS. 5A-5D. Specifically, FIG. 6C illustrates variations of the embodiment of FIGS. 5A-5D depicting an exemplary configuration within a magnetic head 611. Accordingly, various components of FIG. 6C have common numbering with those of FIGS. 5A-5D.

However, such system 610 and others presented herein may be used in various applications and/or in permutations which may or may not be specifically described in the illustrative embodiments listed herein. Further, the system 610 presented herein may be used in any desired environment. Thus FIG. 6C (and the other FIGS.) may be deemed to include any possible permutation.

Looking to FIG. 6C, a lower bump 612 is included on a lower surface of the main pole 504 (e.g., positioned below the second region 517) between the main pole 504 and the leading shield 502. A maximum width of the lower bump 612 measured in the cross-track direction "x" is preferably less than a maximum width of the main pole measured in the same direction. Moreover, the lower bump 612 preferably includes at least one magnetic material, e.g., which may be similar and/or the same as any of the approaches described above.

The lower bump 612 may taper in the track direction "y" toward a media facing side thereof. In other words, a thickness of the lower bump 612 may taper toward a side of the lower bump 612 closest to the media facing surface 503, e.g., as shown in FIG. 6C. However, the non-tapered thickness of the lower bump 612 along the track direction "y" (e.g., the deposition direction) may be between about 100 nm and about 250 nm, more preferably between about 150 nm and about 200 nm but could be higher or lower depending on the desired embodiment.

According to different approaches, an average angle $\Delta$ of the tapering for the lower bump 612 may be between about 10 degrees and about 25 degrees, more preferably between about 15 and about 21 degrees, but may be higher or lower depending on the desired embodiment. It follows that in some approaches, which are in no way intended to limit the invention, the bottom side of the lower bump 612 may have a slope that is about the same as the slope of the upper surface of the pole tip region 516. However, in other approaches, the lower bump 612 may taper more or less therealong toward the media facing side thereof than the main pole 504 directly thereover tapers along the same direction (the height direction "z").

The lower bump 612 and/or main pole 504 may also taper in the cross-track direction "x" towards the media facing surface 503 (e.g., similar to the upper bump 602 as seen in FIG. 6B). Referring still to FIG. 6C, the lower bump 612 may taper less therealong in a cross-track direction "x" toward the media facing side thereof than the main pole 504 directly thereabove tapers along the same direction. Accordingly, sidewalls of the lower bump 612 positioned opposite each other in a cross-track direction "x" form a relatively smaller angle (not shown) than the angle φ (e.g., see FIG. 6B) formed by the sidewalls of the main pole 504 positioned opposite each other in the cross-track direction "x". According to an illustrative approach, the angle (not shown) of tapering for the lower bump 612 may be about 30 degrees, but could be higher or lower depending on the desired embodiment. Moreover, as mentioned above, the angle φ of tapering for the main pole 504 may be greater than about 30 degrees and less than about 90 degrees, e.g., about 60 degrees, but may be higher or lower depending on the desired embodiment.

Figure 6D:
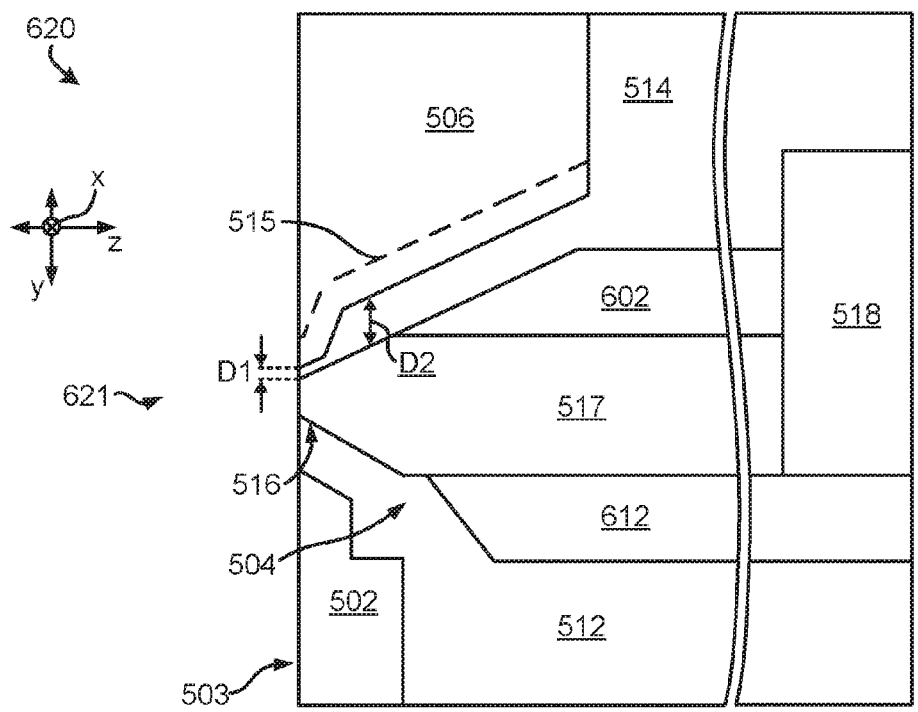
FIG. 6D is a partial cross-sectional view of a magnetic write head according to one embodiment.

FIG. 6D depicts a system 620 having a magnetic head 621 which is illustrated in accordance with yet another embodiment. As an option, the present system 620 may be implemented in conjunction with features from any other embodiment listed herein, such as those described with reference to the other FIGS., such as FIGS. 5A-5D. Specifically, FIG. 6D illustrates variations of the embodiment of FIGS. 5A-5D depicting an exemplary configuration within a magnetic head 621. Accordingly, various components of FIG. 6D have common numbering with those of FIGS. 5A-5D.

However, such system 620 and others presented herein may be used in various applications and/or in permutations which may or may not be specifically described in the illustrative embodiments listed herein. Further, the system 620 presented herein may be used in any desired environment. Thus FIG. 6D (and the other FIGS.) may be deemed to include any possible permutation.

Looking to FIG. 6D, magnetic head 621 includes both an upper bump 602 and a lower bump 612 which sandwich main pole 504. Upper bump 602 and/or lower bump 612 may include any of the configurations described in any of the approaches above. For example, as previously mentioned, the main pole 504 and the upper bump 602 may taper at substantially the same angle towards the media facing surface 503. Thus, the top side of the upper bump 602 may have a slope that is about the same as the slope of the upper surface of the main pole 504 at about the pole tip region 516, e.g., as shown in the present embodiment. Moreover, upper bump 602 and/or lower bump 612 may include one or more magnetic materials of a type known in the art, e.g., depending on the desired embodiment.

It follows that various approaches described herein may be implemented in a given magnetic recording write head to achieve increased ADC. Table 1 below outlines the specific ADC gain percentage increases resulting from the different approaches described herein over a conventional magnetic recording head used as a "reference head".

TABLE 1

| Design Implemented | ADC gain % | |
|---|---|---|
| | PMR | SMR |
| Increased Flare | 1.4-2 | 1.4-2 |
| Thin Throat Height | 1.5 | 1.5 |
| Increased main pole - leading shield spacing | 0 | 1.8 |
| Negative Bevel | 1.0 | 1.0 |
| Increased main pole - trailing shield spacing | 0.8 | 0.8 |
| Upper Bump | 1.5 | 1.5 |
| Lower Bump | 1.7 | 1.7 |

Referring still to Table 1, "Increased Flare" corresponds to embodiments having a main pole with an increased amount of flare compared to the performance of the reference head. As shown, increasing the amount of flare at the main pole resulted in a 1.4% to 2% ADC gain for both perpendicular magnetic recording (PMR) heads as well as shingled magnetic recording (SMR) heads. Similarly, embodiments implementing trailing and/or leading shields having a reduced throat height in comparison to the reference head performance resulted in an ADC gain of 1.5% for PMR as well as SMR heads.

Although increasing the separation between the pole tip region of the main pole and the leading shield along the track direction did not result in any ADC gain for PMR heads, a 1.8% ADC gain was achieved for SMR heads in comparison to the reference head performance. Moreover, implementing a main pole having a negative bevel (e.g., as shown in the media facing surface view of FIG. 5A) resulted in a 1% ADC gain for both PMR and as SMR heads in comparison to the performance of the reference head.

Selectively increasing the separation between the main pole and the trailing shield along the track direction (e.g., as shown in FIGS. 5C-6D) produced a 0.8% ADC gain for both PMR and as SMR heads in comparison to the performance of the reference head. Furthermore, including an upper bump (e.g., as seen in FIGS. 6A-6B and 6D) resulted in a 1.5% ADC gain for both PMR and as SMR heads, while including a lower bump (e.g., as seen in FIGS. 6A-6D) resulted in a 1.7% ADC gain for both PMR and as SMR heads over the reference head performance.

Again, various approaches described herein include different write head designs, any one or more of which may be used to increase ADC for different embodiments.

Moreover, any of the approaches described and/or suggested herein may be implemented in HAMR embodiments having nanobeak antenna configurations of types known in the art. Thus, process flow(s) similar to and/or the same as any of the embodiments included herein may produce desirable performance results for nanobeak antennas. Further still, various approaches described and/or suggested herein may be implemented in HAMR embodiments having front and/or back edge profiles of an NFT antenna which are different than that of a magnetic pole.

It should be noted that methodology presented herein for at least some of the various embodiments may be implemented, in whole or in part, in computer hardware, software, by hand, using specialty equipment, etc. and combinations thereof.

Moreover, any of the dimensions described herein with regard to any of the FIGS. and/or any other embodiment thereof, may be higher or lower than the values listed, depending on the particular sizes and shapes of components in such particular embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a main pole;
a trailing shield; and
a lower bump on the main pole between the main pole and a leading shield, the lower bump comprising a magnetic material,
wherein a first distance D1 is defined in a track direction between the trailing shield and a pole tip region of the main pole;
wherein a second distance D2 is defined in the track direction between the trailing shield and a second region of the main pole located behind the pole tip region,
wherein D2 is greater than D1.

2. The system as recited in claim 1, wherein a third distance D3 is defined in the track direction in a side gap between the trailing shield and a plane extending along an upper surface of the second region of the main pole, wherein D3 is less than D2.

3. The system as recited in claim 2, wherein D3 is greater than D1.

4. The system as recited in claim 2, wherein D3 is substantially the same as D1.

5. The system as recited in claim 1, further comprising an upper bump on the main pole between the main pole and the trailing shield, the upper bump comprising a magnetic material.

6. The system as recited in claim 1, wherein the lower bump tapers in the track direction toward a media facing side thereof.

7. The system as recited in claim 6, wherein an average angle of the tapering is between about 10 and about 21 degrees.

8. The system as recited in claim 1, wherein the lower bump tapers less therealong toward a media facing side thereof than the main pole directly thereover tapers.

9. The system as recited in claim 1, wherein sidewalls of the lower bump positioned opposite each other in a cross-track direction form a relatively smaller angle than an angle formed by sidewalls of the main pole positioned opposite each other in the cross-track direction.

10. A magnetic data storage system, comprising:
at least one magnetic head having the main pole as recited in claim 1;
a magnetic medium;
a drive mechanism for passing the magnetic medium over the at least one magnetic head; and
a controller electrically coupled to the at least one magnetic head for controlling operation of the at least one magnetic head.

11. A system, comprising:
a main pole;
a trailing shield; and
an upper bump on the main pole between the main pole and the trailing shield, the upper bump comprising a magnetic material,
wherein a first distance D1 is defined in a track direction between the trailing shield and a pole tip region of the main pole;
wherein a second distance D2 is defined in the track direction between the trailing shield and a second region of the main pole located behind the pole tip region,
wherein D2 is greater than D1, wherein the upper bump tapers in the track direction toward a media facing side thereof.

12. The system as recited in claim 11, wherein an average angle of the tapering is between about 10 and about 21 degrees.

13. The system as recited in claim 11, wherein the upper bump tapers less therealong in a cross-track direction toward a media facing side thereof than the main pole directly thereunder tapers.

14. The system as recited in claim 11, wherein sidewalls of the upper bump positioned opposite each other in a cross-track direction form a relatively smaller angle than an angle formed by sidewalls of the main pole positioned opposite each other in the cross-track direction.

15. The system as recited in claim 11, wherein the upper bump tapers less therealong toward a media facing side thereof than the main pole directly thereunder tapers.

* * * * *